(12) United States Patent
Heap et al.

(10) Patent No.: US 8,118,903 B2
(45) Date of Patent: Feb. 21, 2012

(54) METHOD FOR PREFERENTIAL SELECTION OF MODES AND GEAR WITH INERTIA EFFECTS FOR A HYBRID POWERTRAIN SYSTEM

(75) Inventors: Anthony H. Heap, Ann Arbor, MI (US); Kee Yong Kim, Ann Arbor, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 707 days.

(21) Appl. No.: 12/236,062

(22) Filed: Sep. 23, 2008

(65) Prior Publication Data
US 2009/0118075 A1   May 7, 2009

Related U.S. Application Data

(60) Provisional application No. 60/985,271, filed on Nov. 4, 2007.

(51) Int. Cl.
*G06F 7/00* (2006.01)
(52) U.S. Cl. .............. 71/51; 701/54; 477/110
(58) Field of Classification Search ............ 701/51, 701/54, 55, 79, 99; 477/110, 115; 180/65.285; 903/945
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 7,673,714 B2 * | 3/2010 | Soliman et al. .......... 180/65.265 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0234624 A1 * | 10/2005 | Matsushima et al. ........... 701/51 |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |

(Continued)

*Primary Examiner* — Gertrude Arthur Jeanglaude

(57) ABSTRACT

A method for controlling a hybrid powertrain system selectively operative in one of a plurality of operating range states including an engine includes monitoring an operator torque request and a rotational speed of the output member, determining inertial effects of the transmissions, determining motor torque outputs from the electrical machines and an engine based upon the inertial effects, and selecting a preferred operating range state and a preferred input speed from the engine to the transmission based upon the operator torque request and the inertial effects.

21 Claims, 10 Drawing Sheets

U.S. PATENT DOCUMENTS

| | | |
|---|---|---|
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0246274 A1* | 10/2007 | Dreibholz et al. ........... 180/65.2 |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1* | 5/2009 | Hsieh et al. ................... 477/110 |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |

| | | |
|---|---|---|
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

\* cited by examiner

METHOD FOR PREFERENTIAL SELECTION OF MODES AND GEAR WITH INERTIA EFFECTS FOR A HYBRID POWERTRAIN SYSTEM

CROSS REFERENCE TO RELATED APPLICATIONS

This application claims the benefit of U.S. Provisional Application No. 60/985,271 filed on Nov. 4, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures include torque-generative devices, including internal combustion engines and electric machines, which transfer torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transferring tractive torque thereto. Electric machines, operative as motors or generators, generate a torque input to the transmission, independently of a torque input from the internal combustion engine. The electric machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for controlling a hybrid powertrain system selectively operative in one of a plurality of operating range states including an engine includes monitoring an operator torque request and a rotational speed of the output member, determining inertial effects of the transmissions, determining motor torque outputs from the electrical machines and an engine based upon the inertial effects, and selecting a preferred operating range state and a preferred input speed from the engine to the transmission based upon the operator torque request and the inertial effects.

BRIEF DESCRIPTION OF THE DRAWINGS

One or more embodiments will now be described, by way of example, with reference to the accompanying drawings, in which.

DETAILED DESCRIPTION

Figure 1:
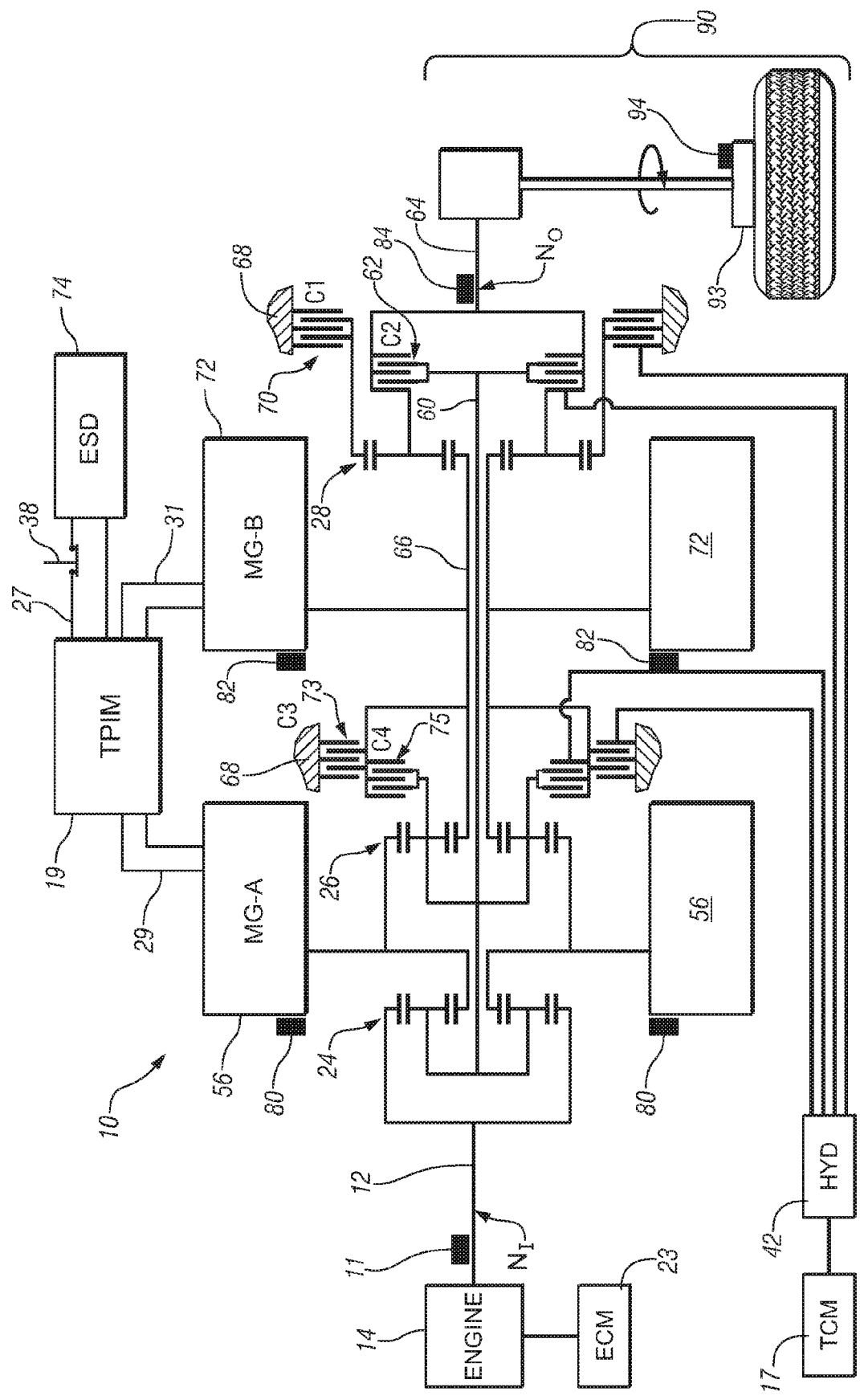
FIG. 1 is a schematic diagram of an exemplary powertrain, in accordance with the present disclosure.
Figure 2:
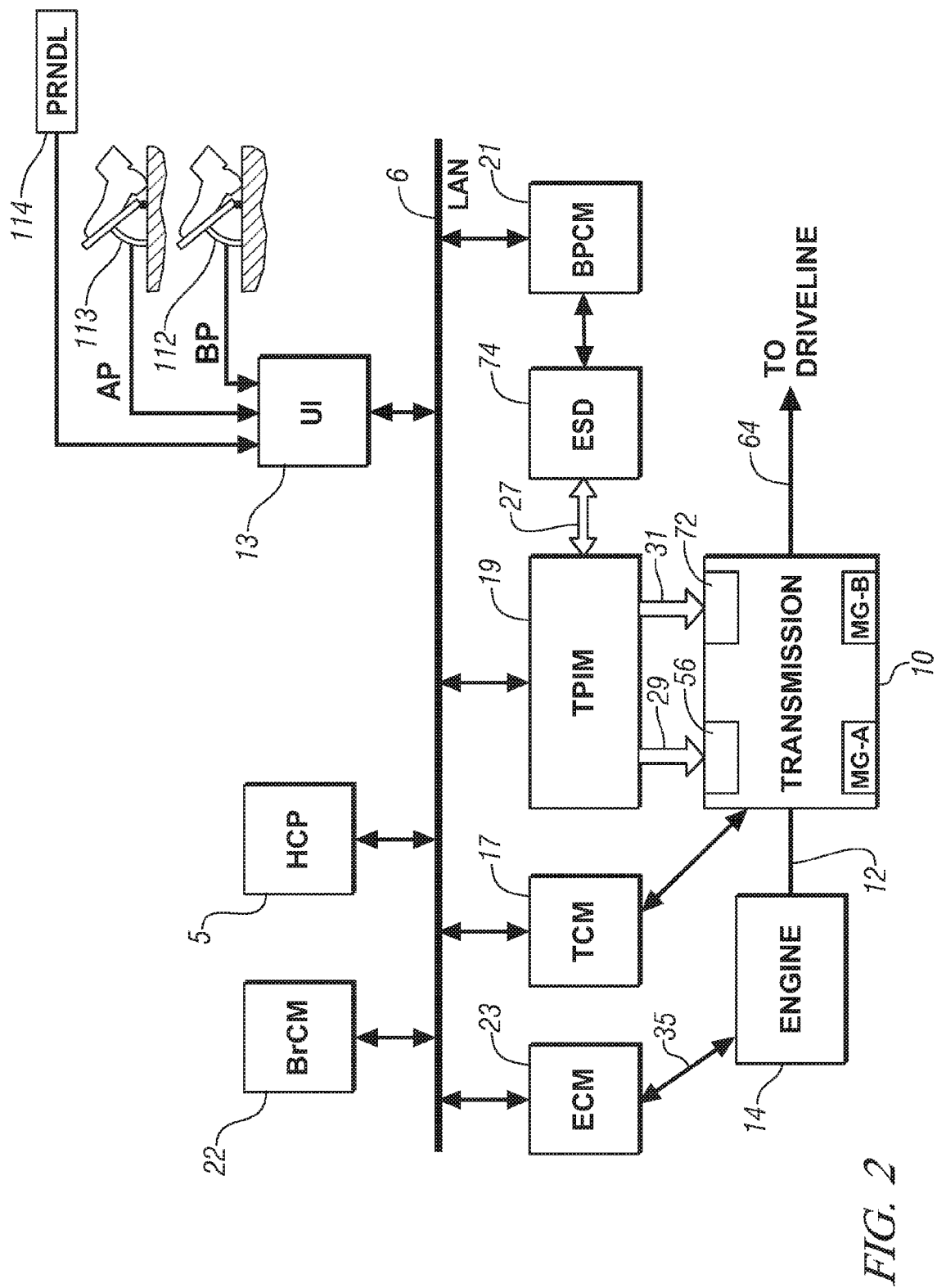
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain system. The exemplary electro-mechanical hybrid powertrain system in accordance with the present disclosure is depicted in FIG. 1, comprising a two-mode, compound-split, electro-mechanical hybrid transmission 10 operatively connected to an engine 14 and torque generating machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a friction brake 94 and a sensor (not shown) adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torque commands $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the motor torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain system. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torque commands $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes 94 on each of the vehicle wheels 93. The BrCM 22 monitors the operator input to the brake pedal 112 and generates control signals to control the friction brakes 94 and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of inputto-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, the input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
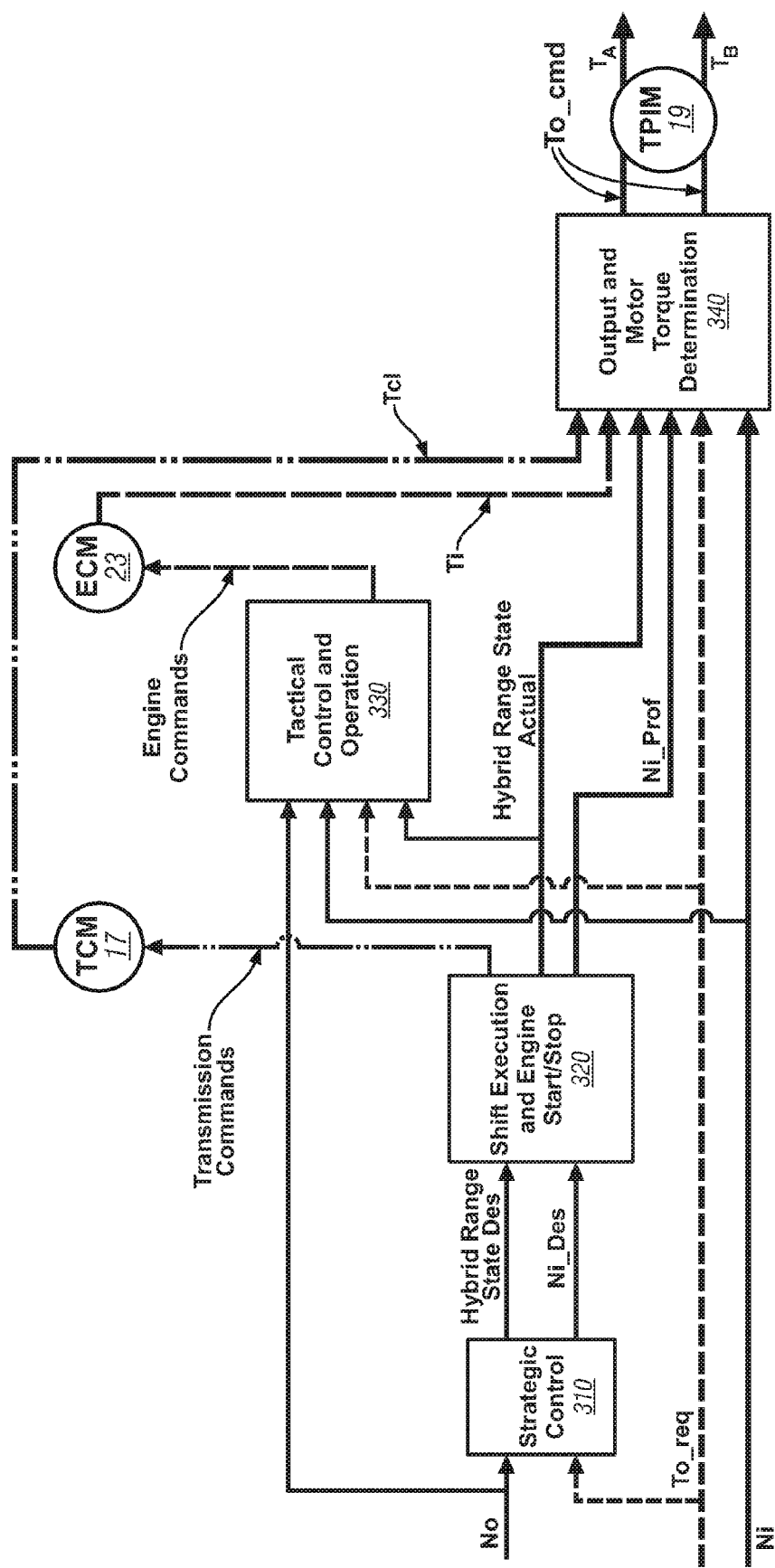
FIG. 3 illustrates a control system architecture for controlling and managing torque in a hybrid powertrain system, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque-generative machines and energy storage systems, e.g., hydraulic-mechanical hybrid transmissions (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No'). The immediate accelerator output torque request is determined based upon a presently occurring operator input to the accelerator pedal 113, and comprises a request to generate an immediate output torque at the output member 64 preferably to accelerate the vehicle. The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. When commanded by the operator, there can be operating conditions under which the predicted brake output torque request is set to zero, e.g., when the operator setting to the transmission gear selector 114 is set to a reverse gear, and when a transfer case (not shown) is set to a four-wheel drive low range.

A strategic control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic control scheme 310. The strategic control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and the present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

For the continuously variable modes, i.e., M1 or M2, the speed relationship between first and second electric machines 56 and 72, the input speed $N_I$ and the output speed $N_O$ is defined as shown in the equation below:

$$\begin{bmatrix} N_A \\ N_B \end{bmatrix} = [A_1] \begin{bmatrix} N_I \\ N_O \end{bmatrix} \qquad [1]$$

wherein $N_I$ comprises the input speed from the engine 14, $N_O$ is the transmission output speed, $N_A$ and $N_B$ are the operating speeds for first and second electric machines 56 and 72, and $A_1$ is a 2×2 matrix of parametric values based upon hardware gear and shaft interconnections determined for the specific application, and for the specific operating range state, i.e., M1 or M2.

The torque relationship between first and second electric machines 56 and 72, the input speed $N_I$, the output speed $N_O$, input torque, and motor torque is defined as:

$$\begin{bmatrix} T_A \\ T_B \end{bmatrix} = \begin{bmatrix} a_{11} & a_{12} \\ a_{21} & a_{22} \end{bmatrix} \begin{bmatrix} T_I \\ T_O \end{bmatrix} + \begin{bmatrix} b_{11} & b_{12} \\ b_{21} & b_{22} \end{bmatrix} \begin{bmatrix} N_I \\ N_O \end{bmatrix} \qquad [2]$$

wherein $T_I$ is the input torque from the engine 14, $T_O$ is the transmission output torque, $T_A$ and $T_B$ are the motor torques for first and second electric machines 56 and 72 and $a_{11}$, $a_{12}$, $a_{21}$, $a_{22}$, $b_{11}$, $b_{12}$, $b_{21}$, and $b_{22}$ are scalar values of known parametric values based upon hardware gear and shaft interconnections determined for the specific application and for the specific continuously variable operating range state, i.e., M1 or M2.

For the fixed gear operating range states, i.e., G1, G2, G3 and G4 in one embodiment, the speed relationship between the first and second electric machines 56 and 72, the engine input speed $N_I$ and the transmission output speed $N_O$ is defined as shown in the equation below:

$$\begin{bmatrix} N_I \\ N_A \\ N_B \end{bmatrix} = [B_1] * N_O \quad [3]$$

wherein $N_I$ comprises the input speed from engine 14, $N_O$ is the transmission output speed, $N_A$ and $N_B$ are the operating speeds for first and second electric machines 56 and 72, and $B_I$ is a 1×3 matrix of known parametric values based upon hardware gear and shaft interconnections determined for the specific application, and for the specific operating range state. In this application, when the transmission output speed, $N_O$ is known, $N_I$ for the engine 14 and $N_A$ and $N_B$ can be determined.

The torque relationships between first and second electric machines 56 and 72, input torque, and motor torque are as defined in Eq. 4 below:

$$T_O = [a \quad b \quad c \quad d \quad e] * \begin{bmatrix} T_I \\ T_A \\ T_B \\ N_i \\ N_o \end{bmatrix} \quad [4]$$

wherein $T_I$ is the input torque from engine 14, $T_O$ is the transmission output torque, i.e., the requested output torque, $T_{O\_REQ}$, $T_A$ and $T_B$ are the motor torques for first and second electric machines 56 and 72, a, b, c, d, and e are known parametric values based upon hardware gear and shaft interconnections determined for the specific application, and for the specific fixed gear operating ranges state.

The torque relationships given in Eqs. 2 and 4 do not compensate for inertial effects within the hybrid powertrain. To compensate for the inertial effects, the rotational acceleration of the input member 12 and the output member 56 are included in Eq. 2 for the mode operating range states. Including the rotational acceleration terms the torque relationship between first and second electric machines 56 and 72, the input speed $N_I$, the output speed $N_O$, the input torque, and motor torques $T_A$ and $T_B$ is defined as:

$$\begin{bmatrix} T_A \\ T_B \end{bmatrix} = \begin{bmatrix} a_{11} & a_{12} \\ a_{21} & a_{22} \end{bmatrix} \begin{bmatrix} T_I \\ T_O \end{bmatrix} + \begin{bmatrix} b_{11} & b_{12} \\ b_{21} & b_{22} \end{bmatrix} \begin{bmatrix} N_I \\ N_O \end{bmatrix} + \begin{bmatrix} c_{11} & c_{12} \\ c_{21} & c_{22} \end{bmatrix} \begin{bmatrix} \dot{N}_I \\ \dot{N}_O \end{bmatrix} \quad [5]$$

wherein $\dot{N}_I$ represents acceleration of the input member 12, $\dot{N}_O$ represents acceleration of output member 64, and $a_{11}, a_{12}, a_{21}, a_{22}, b_{11}, b_{12}, b_{21}, b_{22}, c_{11}, c_{12}, c_{21}$, and $c_{22}$ are known parametric values based upon hardware gear and shaft interconnections determined for the specific application and for the specific operating range state, i.e., M1 or M2.

For the fixed gear operating ranges states, compensating for the inertial effects comprises including the rotational acceleration of the input member 12 in Eq. 4. Including the rotational acceleration of the input member 12 the torque relationships between first and second electric machines 56 and 72, input torque, and output torque are defined as:

$$T_O = [a \quad b \quad c \quad d \quad e \quad f] * \begin{bmatrix} T_I \\ T_A \\ T_B \\ N_i \\ N_o \\ \dot{N}_I \end{bmatrix} \quad [6]$$

wherein $\dot{N}_I$ represents acceleration of the input member 12, and a, b, c, d, e, and f are known parametric values based upon hardware gear and shaft interconnections determined for the specific application, and for the specific operating range state.

Figure 4:
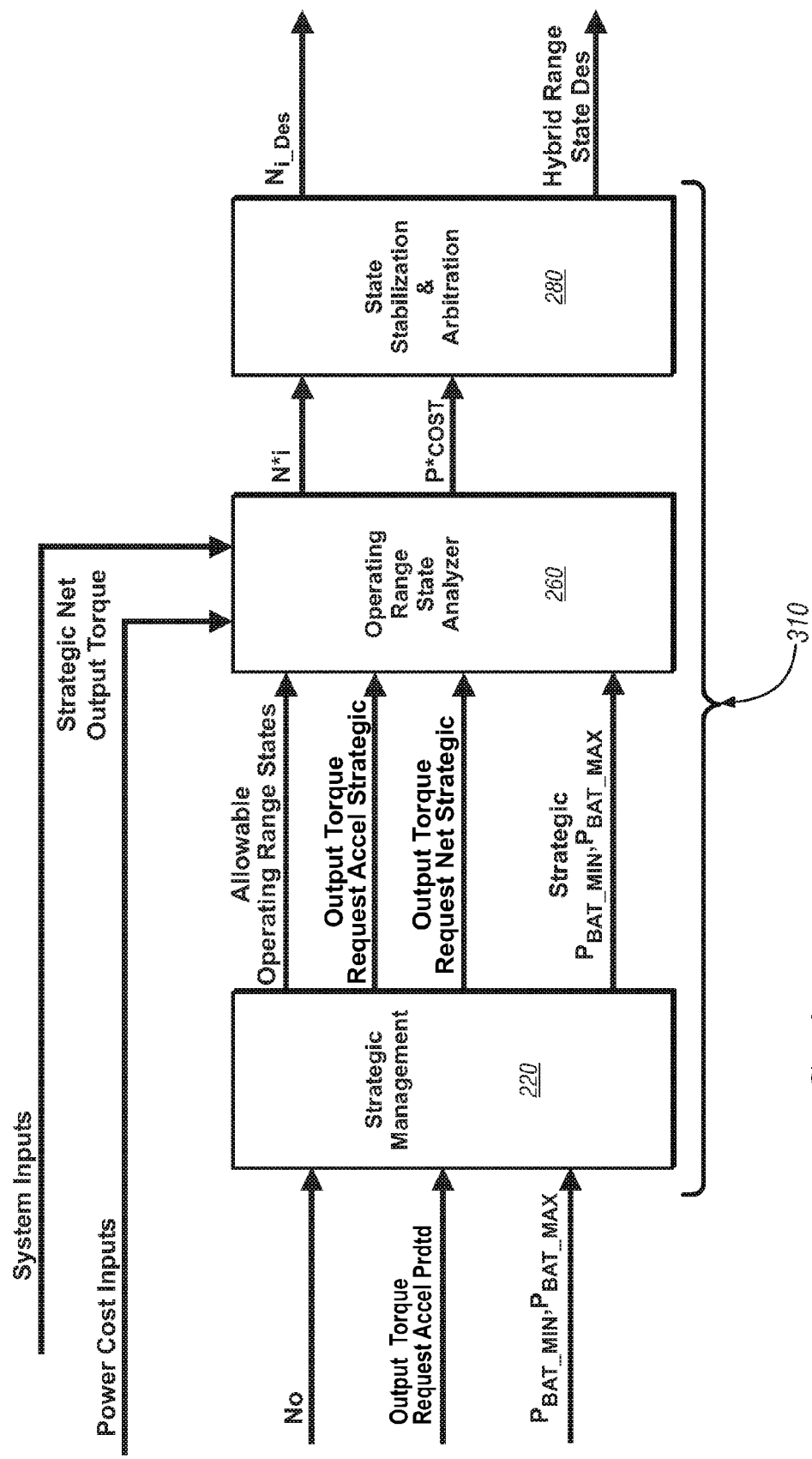
FIG. 4 is a schematic flow diagram illustrating the strategic optimization control scheme, in accordance with the present disclosure.

FIG. 4 details signal flow in the strategic optimization control scheme 310, which includes a strategic manager 220, an operating range state analyzer 260, and a state stabilization and arbitration block 280 to determine the preferred input speed ('Ni_Des') and the preferred transmission operating range state ('Hybrid Range State Des'). The strategic manager ('Strategic Manager') 220 monitors the output speed $N_O$, the predicted accelerator output torque request ('Output Torque Request Accel Prdtd'), the predicted brake output torque request ('Output Torque Request Brake Prdtd'), and available battery power $P_{BAT\_MIN}$ to $P_{BAT\_MAX}$. The strategic manager 220 determines which of the transmission operating range states are allowable, and determines output torque requests comprising a strategic accelerator output torque request ('Output Torque Request Accel Strategic') and a strategic net output torque request ('Output Torque Request Net Strategic'), all of which are input the operating range state analyzer 260 along with system inputs ('System Inputs') and power cost inputs ('Power Cost Inputs'). The operating range state analyzer 260 generates a preferred power cost ('P*cost') and associated input speed ('N*i') for each of the allowable operating range states based upon the operator torque requests, the system inputs, the available battery power and the power cost inputs. The preferred power costs and associated input speeds for the allowable operating range states are input to the state stabilization and arbitration block 280 which selects the preferred operating range state and preferred input speed based thereon.

Figure 5:
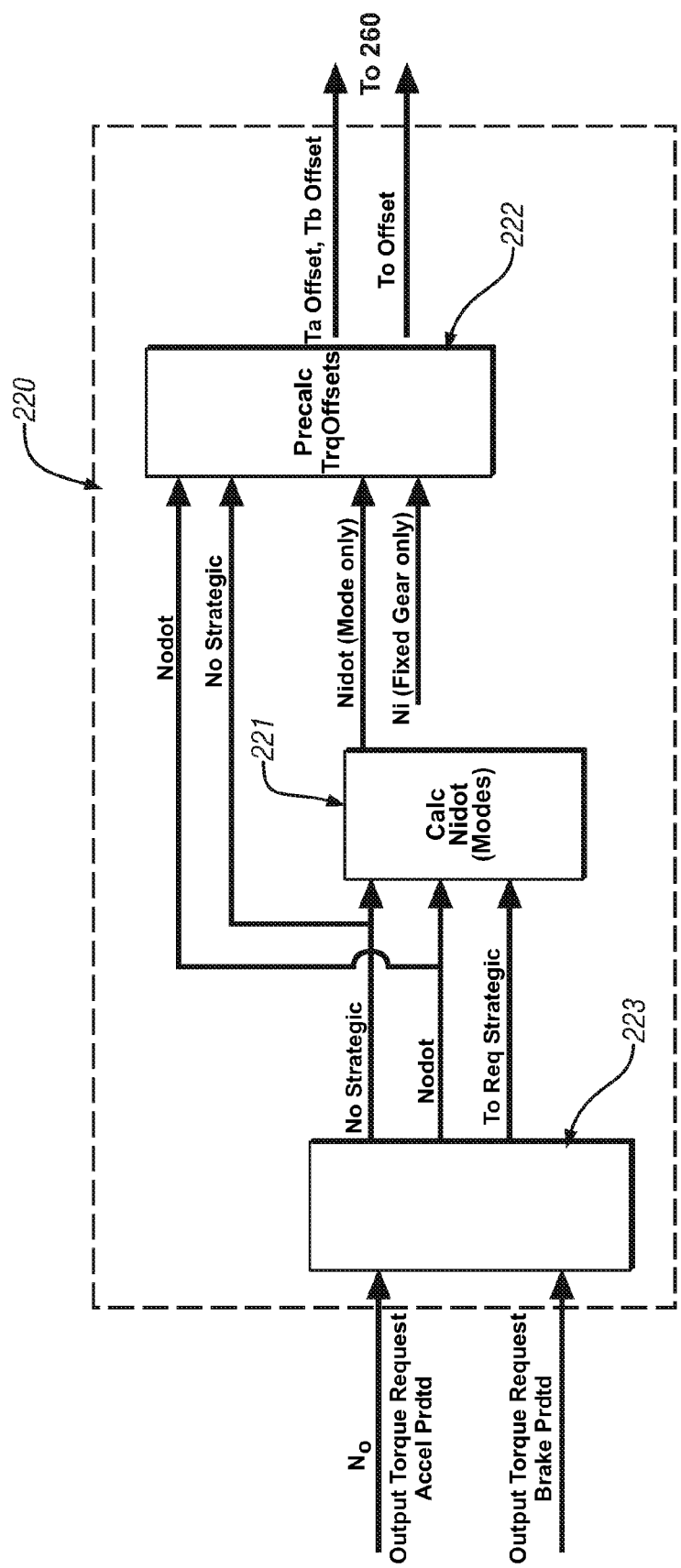
FIG. 5 is a schematic flow diagram illustrating several aspects of a strategic manager, in accordance with the present disclosure.

FIG. 5 shows a functional block diagram detailing an operation of the strategic manager 220. Within the strategic manager 220 are an input acceleration algorithm ('Calc Nidot (Modes)') (221), a torque offset algorithm ('Precalc TrqOffsets') (222), and a strategic manager algorithm (223). Inputs to the strategic manager algorithm include the predicted accelerator output torque request ('Output Torque Request Accel Prdtd'), the predicted brake output torque request ('Output Torque Request Brake Prdtd'), and the output speed ('$N_O$'). The strategic manager algorithm 223 determines a strategic output speed, the strategic torque request, and a rotational output acceleration of the output member 64. The input acceleration algorithm 221 inputs the strategic output speed ('No Strategic'), the strategic torque request ('To Req Strategic'), and the rotational output acceleration ('Nodot'). The input acceleration algorithm 221 determines a rotational input acceleration ('Nidot') of the input member 12 for the continuously variable modes M1 and M2. The torque offset algorithm 222 determines a torque offset for each of the first and second electrical machines 56 and 72 ('Ta offset' and 'Tb offset') for operating in one of the continuously variable modes and an output torque offset for the operating in one of the fixed gears ('To offset'). The torque offsets are preferably determined in the strategic manager 220 for increased computational efficiency. The torque offsets are output to the operating range state analyzer 260 as described hereinbelow.

Preferably, the strategic output speed comprises a predicted output speed occurring at a future time instant. One method for determining the predicted output speed comprises determining a time-based derivative of the monitored output speed No, multiplying the resultant with an elapsed time from the present to the future time instant and adding the resultant to the monitored output speed No. The strategic torque request is preferably a predicted operator torque request for a future time instant and is preferably based upon the predicted accelerator output torque request. The rotational output acceleration is preferably determined based upon the monitored output speed. The rotational output acceleration can be determined by calculating a time-based derivative of the output speed $N_O$ and adding the resultant to the monitored output speed No.

Preferably, for efficient implementation of Eq. 6 above and for the mode operating range states M1 and M2, motor torque offsets are determined for each of the first and second electrical machines 56 and 72. The motor torque offsets are determined based upon the rotational output acceleration, the rotational input acceleration, and the strategic output speed. The torque offset for the first electrical machine 56 is determined based on the following equation:

$$T_{A\_OFFSET} = b_{12}N_O + c_{11}\dot{N}_I + c_{12}\dot{N}_O \qquad [7]$$

wherein $N_O$ represents output speed,
$\dot{N}_I$ represents input acceleration,
$\dot{N}_O$ represents output acceleration, and
$b_{12}$, $c_{11}$, and $c_{12}$ represent known parametric values based upon hardware gear and shaft interconnections determined for the specific application, and for the specific operating range state.

The torque offset for the second electrical machine 72 is determined based on the following equation:

$$T_{B\_OFFSET} = b_{22}N_O + c_{21}\dot{N}_I + c_{22}\dot{N}_O \qquad [8]$$

wherein $N_O$ represents output speed,
$\dot{N}_I$ represents input acceleration,
$\dot{N}_O$ represents output acceleration, and
$b_{22}$, $c_{21}$, and $c_{22}$ represent known parametric values based upon hardware gear and shaft interconnections determined for the specific application, and for the specific operating range state.

Preferably, for efficient implementation of Eq. 6 above and for the fixed gear operating range states, an output torque offset is determined. The torque offset is determined based upon the rotational output acceleration, the strategic output speed, and the input speed $N_I$. The output torque offset is determined based on the following equation:

$$T_O\text{Offset} = d\dot{N}_I + eN_O + f\dot{N}_I \qquad [9]$$

wherein d, e, and f represent known parametric values based upon hardware gear and shaft interconnections determined for the specific application, and for the specific operating range state.

Figure 6:
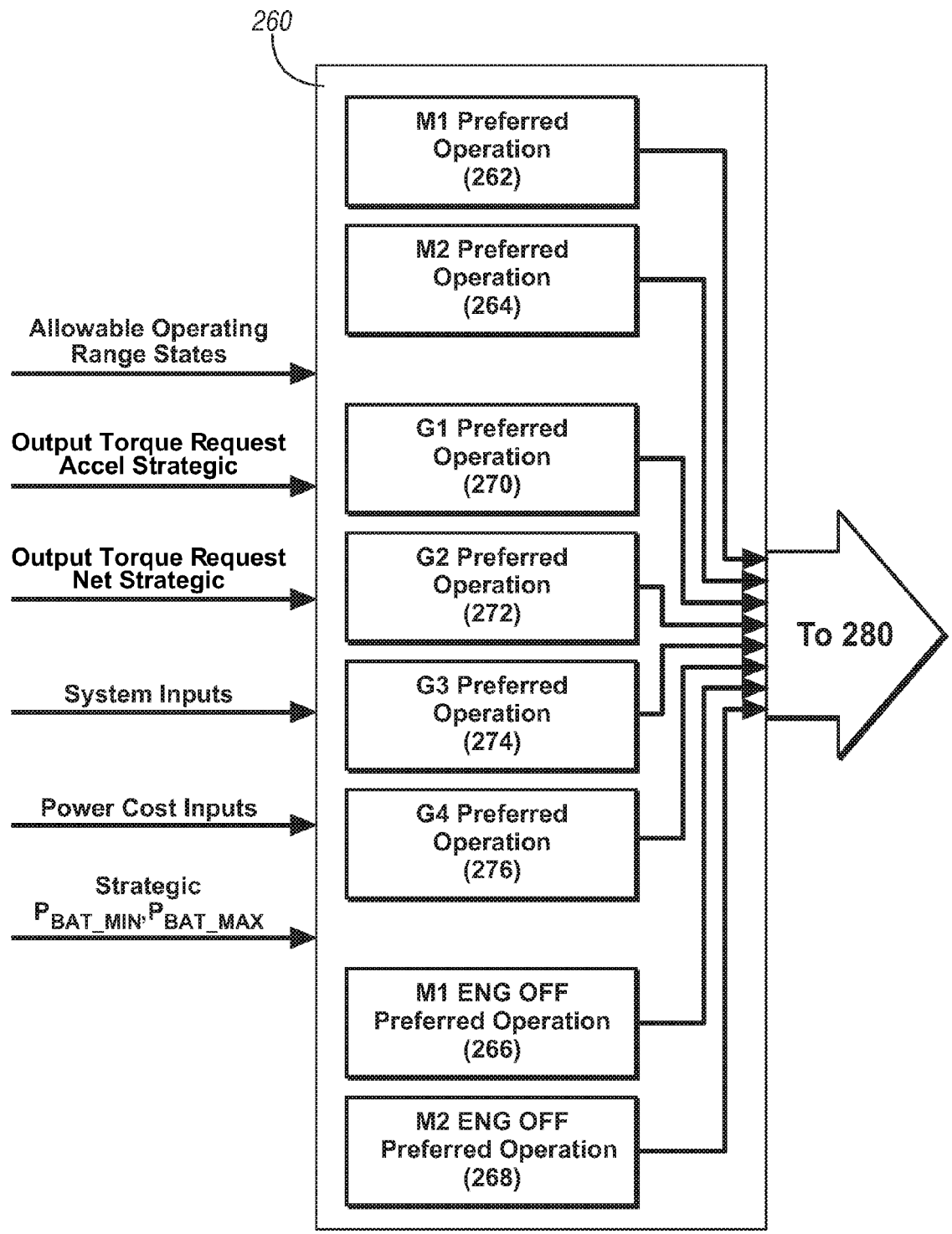
FIG. 6 is a schematic flow diagram illustrating the strategic optimization scheme, in accordance with the present disclosure.

FIG. 6 shows the operating range state analyzer 260. The operating range state analyzer 260 executes searches in each candidate operating range state comprising the allowable ones of the operating range states, including M1 (262), M2 (264), G1 (270), G2 (272), G3 (274), and G4 (276) to determine preferred operation of the torque actuators, i.e., the engine 14 and the first and second electric machines 56 and 72 in this embodiment. The preferred operation preferably comprises a minimum power cost for operating the hybrid powertrain system and an associated engine input for operating in the candidate operating range state in response to the operator torque request. The associated engine input comprises at least one of a preferred engine input speed ('Ni*'), a preferred engine input power ('Pi*'), and a preferred engine input torque ('Ti*') that is responsive to and preferably meets the operator torque request. The operating range state analyzer 260 evaluates M1-Engine Off (264) and M2-Engine Off (266) to determine a preferred cost ('P*cost') for operating the powertrain system responsive to and preferably meeting the operator torque request when the engine 14 is in the engine-off state.

Figure 7:
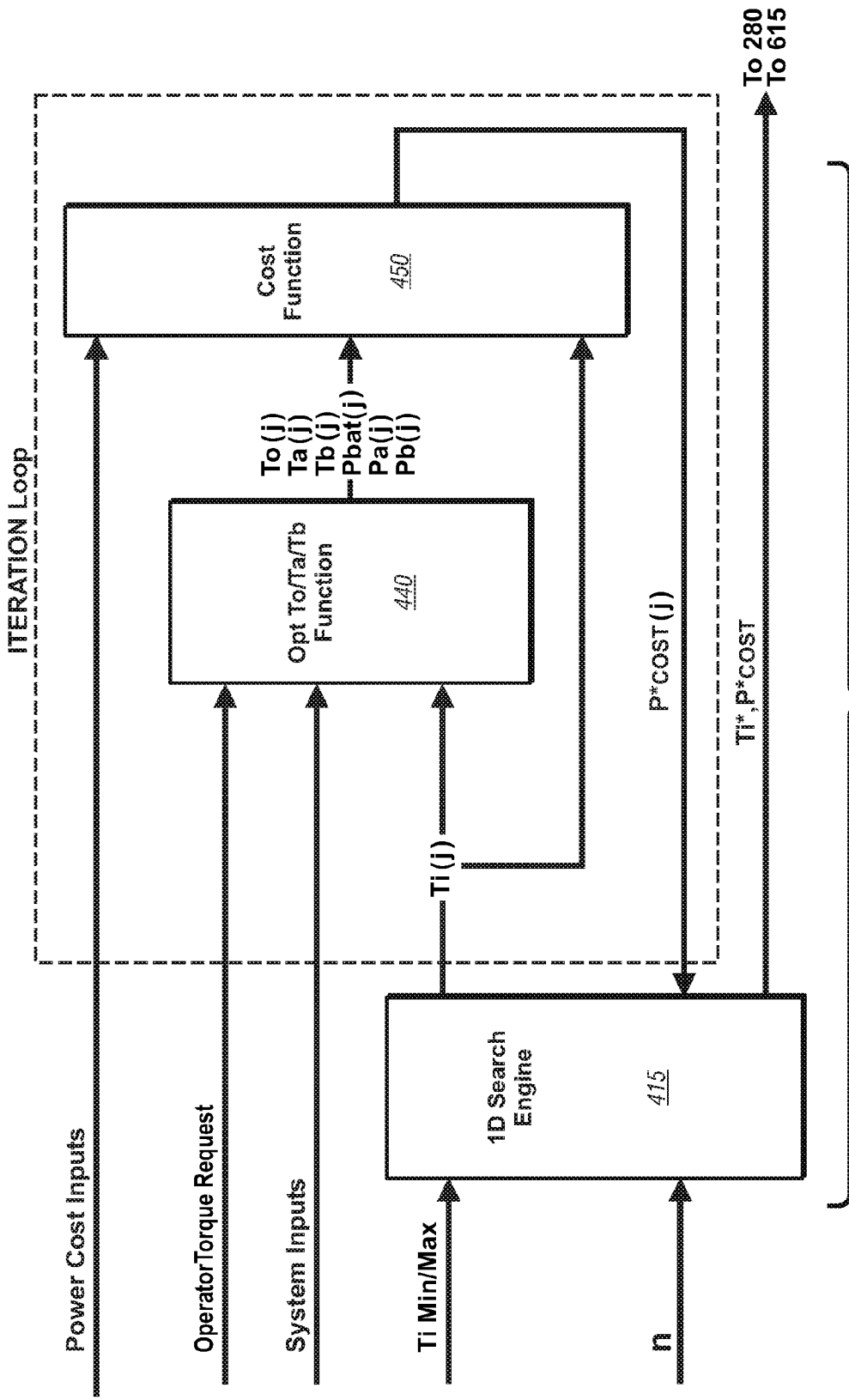
FIGS. 7-9 are schematic flow diagrams, in accordance with the present disclosure.

FIG. 7 schematically shows signal flow for the 1-dimension search scheme 610. A range of one controllable input, in this embodiment comprising minimum and maximum input torques ('TiMin/Max'), is input to a 1-D search engine 415. The 1-D search engine 415 iteratively generates candidate input torques ('Ti(j)') which range between the minimum and maximum input torques, each which is input to an optimization function ('Opt To/Ta/Tb') 440, for n search iterations. Other inputs to the optimization function 440 include system inputs preferably comprise parametric states for battery power, clutch torques, electric motor operation, transmission and engine operation, the specific operating range state and the operator torque request. The optimization function 440 determines transmission operation comprising an output torque, motor torques, and associated battery powers ('To(j), Ta(j), Tb(j), Pbat(j), Pa(j), Pb(j)') associated with the candidate input torque based upon the system inputs in response to the operator torque request for the candidate operating range state.

Figure 8:
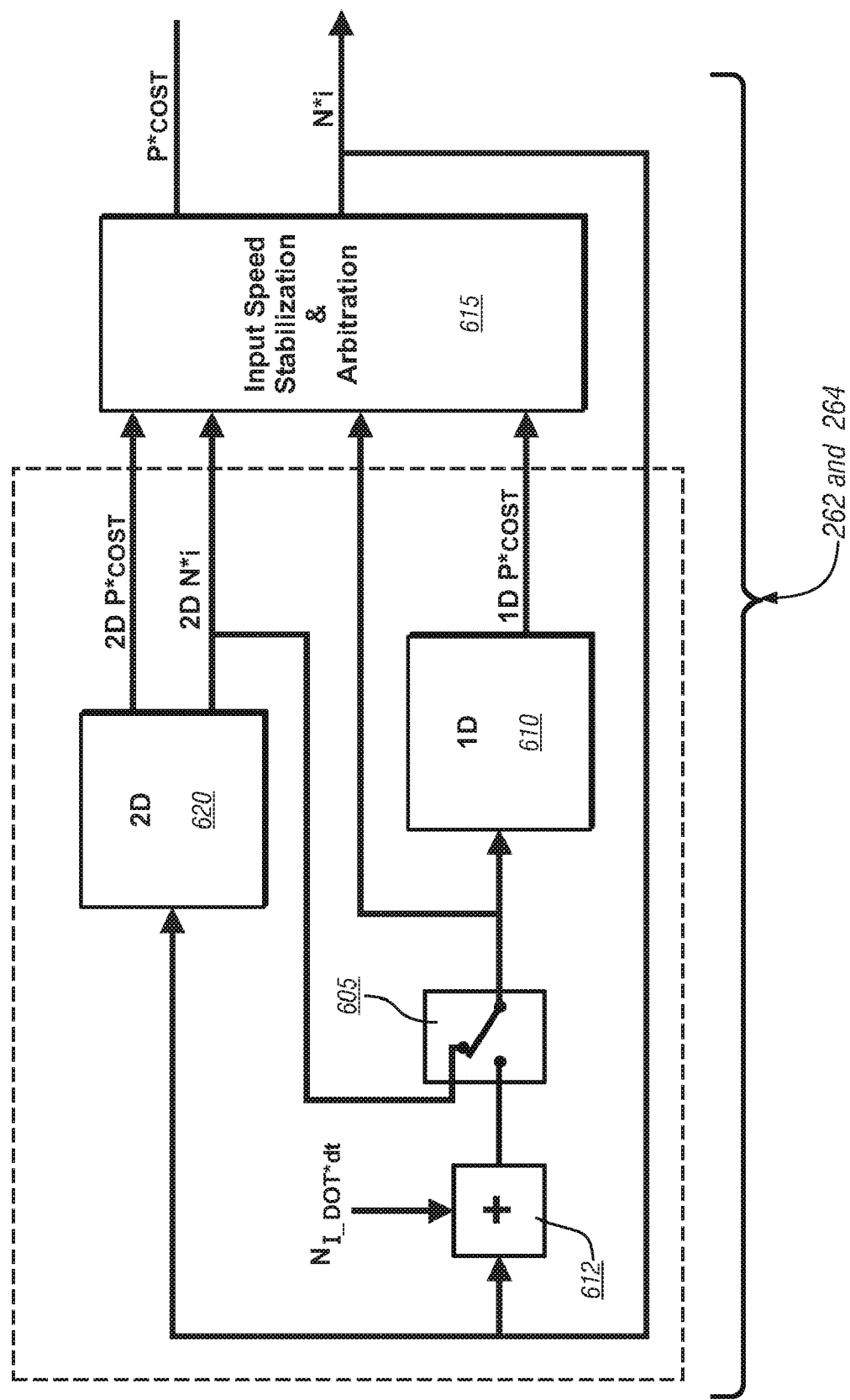

FIG. 8 shows the preferred operation in each of continuously variable modes M1 and M2 executed in blocks 262 and 264 of the operating range state analyzer 260. This includes executing a 2-dimensional search scheme 620, shown with reference to FIGS. 7 and 9, in conjunction with executing a 1-dimensional search using the 1-dimensional search scheme 610 based upon a previously determined input speed which can be arbitrated ('Input Speed Stabilization and Arbitration') 615 to determine preferred costs ('P*cost') and associated preferred input speeds ('N*i') for the operating range states. As described with reference to FIG. 8, the 2-dimensional search scheme 620 determines a a first preferred cost ('2D P*cost') and an associated first preferred input speed ('2D N*I'). The first preferred input speed is input to the 2-dimensional search scheme 620 and to an adder 612. The adder 612 sums the first preferred input speed and a time-rate change in the input speed ('$N_{I\_DOT}$') multiplied by a predetermined time period ('dt'). The resultant is input to a switch 605 along with the first preferred input speed determined by the 2-dimensional search scheme 620. The switch 605 is controlled to input either the resultant from the adder 612 or the preferred input speed determined by the 2-dimensional search scheme 620 into the 1-dimensional search scheme 610. The switch 605 is controlled to input the preferred input speed determined by the 2-dimensional search scheme 620 into the 1-dimensional search scheme 610 (as shown) when the powertrain system is operating in a regenerative braking mode, e.g., when the operator torque request includes a request to generate an immediate output torque at the output member 64 to effect a reactive torque with the driveline 90 which preferably decelerates the vehicle. The switch 605 is controlled to a second position (not shown) to input the resultant from the adder 612 when the operator torque request does not include regenerative braking. The 1-dimensional search scheme 610 is executed to determine a second preferred cost ('1D P*cost') using the 1-dimensional search scheme 610, which is input to the input speed stabilization and arbitration block 615 to select a final preferred cost and associated preferred input speed.

Figure 9:
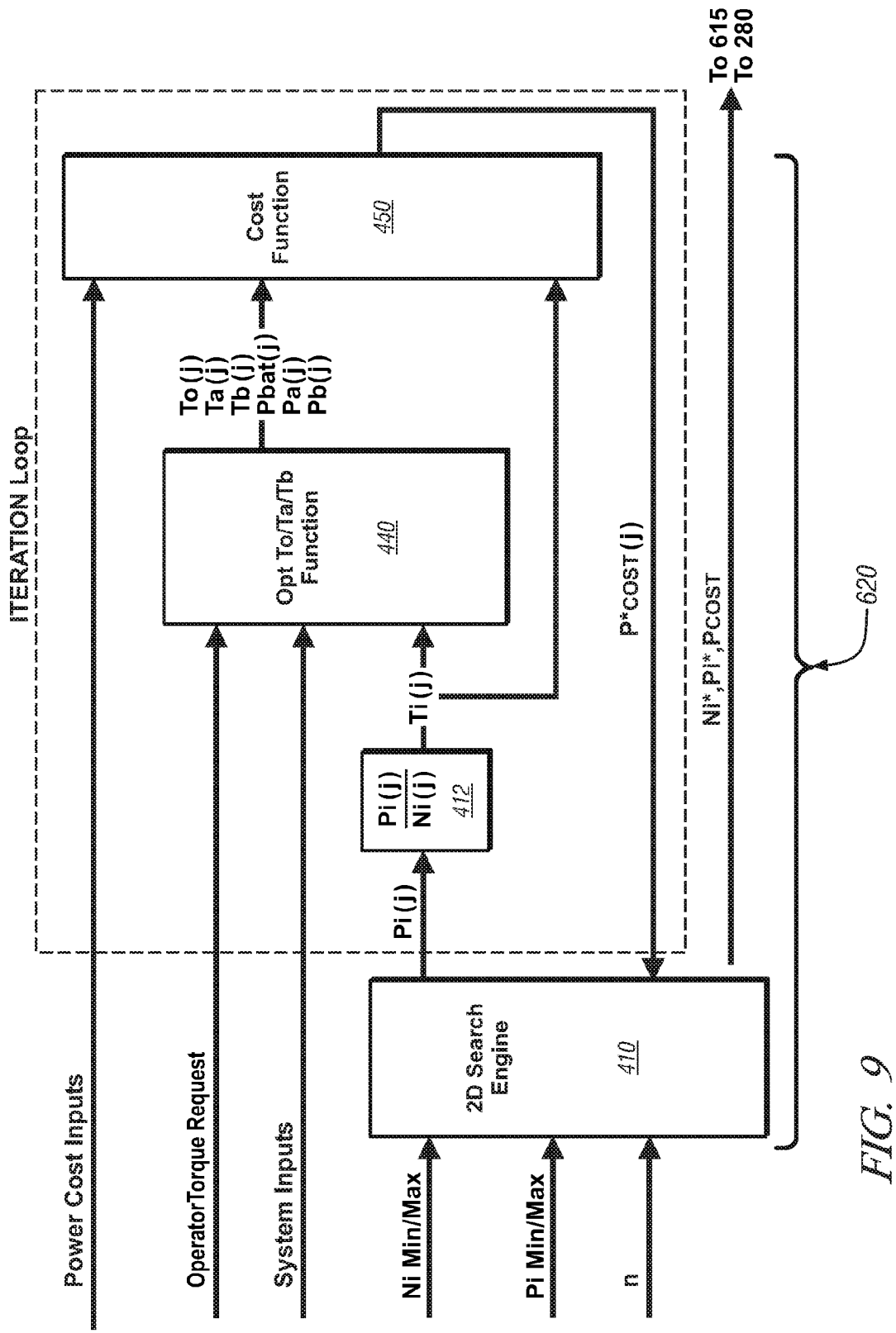

FIG. 9 schematically shows signal flow for the 2-dimension search scheme 620. Ranges of two controllable inputs, in this embodiment comprising minimum and maximum input speeds ('NiMin/Max') and minimum and maximum input powers ('PiMin/Max') are input to a 2-D search engine 410. In another embodiment, the two controllable inputs can comprise minimum and maximum input speeds and minimum and maximum input torques. The 2-D search engine 410 iteratively generates candidate input speeds ('Ni(j)') and candidate input powers ('Pi(j)') which range between the minimum and maximum input speeds and powers. The candidate input power is preferably converted to a candidate input torque ('Ti(j)') (412). Each candidate input speed ('Ni(j)') and candidate input torque ('Ti(j)') are input to an optimization function ('Opt To/Ta/Tb') 440, for n search iterations. Other inputs to the optimization function 440 include system inputs preferably comprising parametric states for battery power, clutch torques, electric motor operation, transmission and engine operation, the specific operating range state and the operator torque request. The optimization function 440 determines transmission operation comprising an output torque, motor torques, and associated battery powers ('To(j), Ta(j), Tb(j), Pbat(j), Pa(j), Pb(j)') associated with the candidate input power and candidate input speed based upon the system inputs and the operating torque request for the candidate operating range state.

Additional inputs into the optimization function 440 include the motor torque offsets and the output torque offset. For the fixed gear operating ranges states, the optimization function 440 determines the output torque for each candidate input speeds Ni(j) and candidate input torque Ti(j) based upon the output torque offset determined in the strategic manager 220, motor torques, and known parametric values based upon hardware gear and shaft interconnections determined for the specific application, and for the specific operating range state. The output torque can be determined based upon the following equation:

$$T_O(j) = \begin{bmatrix} a & b & c \end{bmatrix} \begin{bmatrix} T_I(j) \\ T_A(j) \\ T_B(j) \end{bmatrix} + T_O \text{Offset} \quad [10]$$

wherein
$T_A(j)$ represents motor torque for the first electric machine 56,
$T_B(j)$ represents motor torque for the second electric machine 72,
$T_I(j)$ represents engine input torque to the transmission 10,
$T_O(j)$ is the output torque out of the transmission 10, and
a, b, and c are known parametric values based upon hardware gear and shaft interconnections determined for the specific application and for the specific operating range state.

For the continuously variable mode operating range states M1 and M2, the optimization function 440 determines the output torque and motor torques for each candidate input speeds Ni(j) and candidate input powers Pi(j) based upon the motor torque offsets determined in the strategic manager 220, the candidate input torque Ti(j), output torque, candidate input speed Ni(j), and known parametric values based upon hardware gear and shaft interconnections determined for the specific application, and for the specific operating range state. The output torque and motor torques are determined based upon the following equation:

$$\begin{bmatrix} T_A(j) \\ T_B(j) \end{bmatrix} = \begin{bmatrix} a_{11} & a_{12} \\ a_{21} & a_{22} \end{bmatrix} \begin{bmatrix} T_I(j) \\ T_O(j) \end{bmatrix} + \begin{bmatrix} b_{11} \cdot N_I(j) \\ b_{21} \cdot N_I(j) \end{bmatrix} \begin{bmatrix} T_A \text{Offset} \\ T_B \text{Offset} \end{bmatrix} \quad [11]$$

wherein
$T_A(j)$ represents motor torque for the first electric machine 56,
$T_B(j)$ represents motor torque for the second electric machine 72,
$T_I(j)$ represents engine input torque to the transmission 10,
$T_O(j)$ is the output torque out of the transmission 10,
$N_I(j)$ represents input speed, and
$a_{11}, a_{12}, a_{21}, a_{22}, b_{11}, b_{21}$ are known parametric values based upon hardware gear and shaft interconnections determined for the specific application and for the specific operating range state.

The output torque ('$T_O(j)$'), motor torques ('$T_A(j)$') and ('$T_B(j)$'), and associated battery powers and power cost inputs are input to a cost function 450, which executes to determine a power cost ('Pcost(j)') for operating the powertrain at the candidate input power or candidate input torque and candidate input speed in response to the operator torque request in the candidate operating range state. The 1-D search engine 415 iteratively generates candidate input torques over the range of input torques and determines the power costs associated therewith to identify a preferred input torque ('Ti*') and associated preferred power cost ('P*cost'). The preferred input torque ('Ti*') comprises the candidate input torque within the range of input torques that results in a minimum power cost of the candidate operating range state, i.e., the preferred power cost. The 2-D search engine 410 iteratively generates the candidate input powers and candidate input speeds over the range of input speeds and range of input powers and determines the power costs associated therewith to identify a preferred input power ('Pi*') and preferred input speed ('Ni*') and associated preferred cost ('P*cost'). The preferred input power ('Pi*') and preferred input speed ('Ni*') comprises the candidate input power and candidate input speed that result in a minimum power cost for the candidate operating range state.

Figure 10:
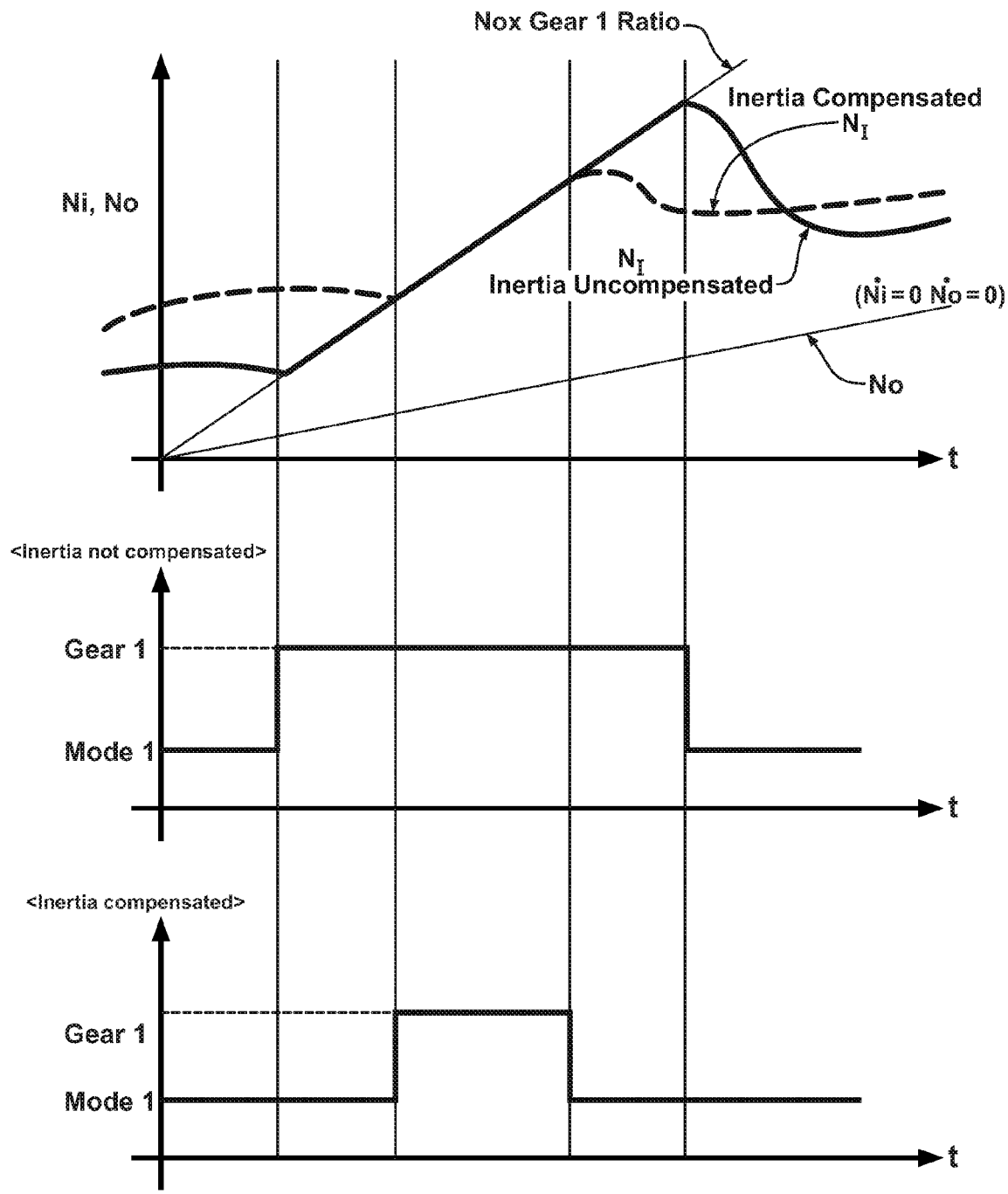
FIG. 10 is a datagraph, in accordance with the present disclosure.

FIG. 10 graphically illustrates the input speed determined without compensating for inertial effects and a preferred input speed determined with compensating for inertial effect during transitions between G1 and M1. In this depiction, compensating for inertial effects increases preferred input speed determinations for the fixed gear mode operating range states greater than preferred input speed determinations for the mode operating range states. The preferred input speed determinations affect power of the engine 14, e.g., additional preferred input speed requires additional engine power.

The additional power required to increase or decrease the engine input speed $N_I$ affects power cost determinations ('Pcost') for each operating range state. When motor torques $T_A$ and $T_B$ are determined based upon the inertia effects resulting from inclusion of the acceleration terms $\dot{N}_I$ and $\dot{N}_O$ in the optimization function 440 additional power required to increase or decrease the engine input speed $N_I$ is compensated in the power cost determinations.

As depicted in FIG. 10, the additional power affects a trajectory of the input speed $N_I$ based upon the operating range state selection. When inertia is uncompensated, the power cost determinations do not account for the additional power required to increase or decrease the engine input speed $N_I$. The operating range state selection is based upon non-preferred power cost determinations thereby resulting in a trajectory of the input speed $N_I$ that is less efficient. As FIG. 10 shows for an exemplary situation, inertia compensation increases operating time in M1 and decreases operating time in fixed gear mode operating range state G1 based upon a higher calculated power cost for operating in G1 thereby increasing the total powertrain system efficiency.

The state stabilization and arbitration block 280 selects a preferred transmission operating range state ('Hybrid Range State Des') which preferably is the transmission operating range state associated with the minimum preferred power cost for the allowed operating range states output from the operating range state analyzer 260, taking into account factors related to arbitrating effects of changing the operating range state on the operation of the transmission to effect stable powertrain operation. The preferred input speed ('Ni_Des') is the engine input speed associated with the preferred engine input comprising the preferred engine input speed ('Ni*'), the preferred engine input power ('Pi*'), and the preferred engine input torque ('Ti*') that is responsive to and preferably meets the operator torque request for the selected preferred operating range state.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain system including an engine coupled to an input member of a transmission device including torque generating machines and an energy storage device connected thereto, the transmission operative to transfer power between the input member and an output member of the transmission and the torque generating machines and selectively operative in one of a plurality of operating range states, the method comprising:
monitoring an operator torque request and a rotational speed of the output member;
determining inertial effects of the transmission comprising inertial effects of the input member and the output member;
determining motor torque outputs from the torque generating machines and an input torque from the engine based upon the inertial effects; and
selecting a preferred operating range state and a preferred input speed of the input member based upon the operator torque request and the inertial effects, said preferred input speed of the input member comprising an engine input speed to the transmission and selected to compensate for additional power required to one of increase and decrease the input speed of the input member resulting from the determined inertial effects.

2. The method of claim 1, wherein the inertial effect of the output member is based upon the rotational speed of the output member.

3. The method of claim 1, further comprising determining the inertial effect of the input member for a fixed gear operating range state based upon the inertial effect of the output member for the fixed gear mode operating range state.

4. The method of claim 3, comprising determining the inertial effect of the input member based upon the inertial effect of the output member and parametric values based upon hardware gear and shaft interconnections and the fixed gear mode operating range state.

5. The method of claim 1, wherein the inertial effect of the output member comprises a change in the output member speed over a predetermined elapsed time period.

6. The method of claim 1, wherein the inertial effect of the output member comprises a rotational acceleration of the output member and wherein the inertial effect of the input member comprises a rotational acceleration of the input member.

7. Method for controlling a powertrain system including an engine coupled to an input member of a transmission including torque generating machines and an energy storage device connected thereto, the transmission operative to transfer power between the input member and an output member and the torque generating machines and selectively operative in one of a plurality of operating range states, the method comprising:
monitoring an operator torque request and a rotational speed of the output member;
determining inertial effects of the transmission;
determining motor torque outputs from the torque generating machines and an input torque from the engine based upon the inertial effects;
selecting a preferred operating range state and a preferred input speed of the input member based upon the operator torque request and the inertial effects;
monitoring the input torque from the engine to the transmission;
iteratively determining motor torques for the torque generating machines based upon the engine input torque, the inertial effects, and the operating range state;
determining a power cost for operating at each of the iteratively determined motor torques of the torque generating machines and the engine input torque for each operating range state;
selecting a preferred power cost and corresponding desired engine operating point based upon the costs for each of the operating range states; and
selecting the preferred operating range state based upon the preferred costs for the operating range states.

8. The method of claim 7, further comprising:
iteratively determining motor torques for the torque generating machines for a fixed gear mode operating range state; and
determining a power cost for operating at each of the iteratively determined motor torques of the torque generating machines and the engine operating point comprising engine input torque for each of the fixed gear mode operating range states.

9. The method of claim 7, wherein engine operating points comprise engine input speed and engine input power, and further comprising:
iteratively determining motor torques for the torque generating machines for a continuously variable operating mode; and
determining a cost for operating at each of the iteratively determined motor torques of the torque generating machines and the engine input torque for each of the continuously variable operating modes.

10. The method of claim 9, further comprising:
determining ranges of permissible input speeds and engine input power;
executing a two-dimensional search engine to iteratively generate parametric values within the ranges of permissible input speeds and engine input power;
determining motor torques for the torque generating machines based upon the generated parametric values and the operating range state; and
identifying a preferred engine input power and preferred motor torques effective to expend a minimum cost.

11. The method of claim 10, further comprising controlling operation of the engine to achieve the preferred engine input power.

12. The method of claim 10, comprising determining the motor torques for the torque generating machines based upon the following equation $$\begin{bmatrix} T_A \\ T_B \end{bmatrix} = \begin{bmatrix} a_{11} & a_{12} \\ a_{21} & a_{22} \end{bmatrix} \begin{bmatrix} T_I \\ T_O \end{bmatrix} + \begin{bmatrix} b_{11} & b_{12} \\ b_{21} & b_{22} \end{bmatrix} \begin{bmatrix} N_I \\ N_O \end{bmatrix} + \begin{bmatrix} c_{11} & c_{12} \\ c_{21} & c_{22} \end{bmatrix} \begin{bmatrix} \dot{N}_I \\ \dot{N}_O \end{bmatrix}$$

wherein
$\dot{N}_I$ represents the rotational acceleration of the input member,
$\dot{N}_O$ represents the rotational acceleration of the output member,
$T_A$ represents motor torque for a first torque generating machine,
$T_B$ represents motor torque for a second torque generating machine,
$T_I$ represents engine input torque to the transmission,
$T_O$ is the output torque out of the transmission,
$N_I$ is the input speed,
$N_O$ is the output speed, and
$a_{11}$, $a_{12}$, $a_{21}$, $a_{22}$, $b_{11}$, $b_{12}$, $b_{21}$, $b_{22}$, $c_{11}$, $c_{12}$, $c_{21}$, and $c_{22}$ are known parametric values determined based upon hardware gear and shaft interconnections.

13. Method for controlling a powertrain system including an engine coupled to an input member of an electro-mechanical transmission device including electric machines and an energy storage device connected thereto, the electro-mechanical transmission device operative to transfer power between an input member and an output member of the transmission device and the electric machines and selectively operative in one of a plurality of operating range states, the method comprising:
monitoring an operator torque request and a rotational speed of the output member;
determining an inertial effect of the output member based upon the rotational speed of the output member;
determining an inertial effect of the input member;
determining motor torque outputs from the electrical machines and an engine based upon the inertial effects; and
selecting a preferred operating range state and a preferred input speed of the input member based upon the operator torque request and the inertial effects, said preferred input speed of the input member comprising an engine input speed to the transmission device and selected to compensate for additional power required to one of increase and decrease the input speed of the input member resulting from the inertial effects of the output member and the input member.

14. The method of claim 13, further comprising determining the inertial effect of the input member for fixed gear operating range states based upon the inertial effect of the output member, parametric values based upon hardware gear and shaft interconnections and the fixed gear mode operating range state.

15. The method of claim 13, wherein the inertial effect of the output member comprises a change in the output member speed over a predetermined elapsed time period.

16. The method of claim 13, wherein the inertial effect of the output member comprises a rotational acceleration of the output member and wherein the inertial effect of the input member comprises a rotational acceleration of the input member.

17. Method for controlling a powertrain system including an engine coupled to an input member of an electro-mechanical transmission device including electric machines and an energy storage device connected thereto, the electro-mechanical transmission device operative to transfer power between an input member and an output member and the electric machines and selectively operative in one of a plurality of operating range states, the method comprising:
monitoring an operator torque request and a rotational speed of the output member;
determining an inertial effect of the output member based upon the rotational speed of the output member;
determining an inertial effect of the input member;
determining motor torque outputs from the electrical machines and an engine based upon the inertial effects;
selecting a preferred operating range state based upon the operator torque request and the inertial effects;
monitoring an engine input torque to the transmission;
iteratively determining motor torques for the electric machines based upon the engine input torque, the inertial effects, and the operating range state;
determining a cost for operating at each of the iteratively determined motor torques of the electric machines and the engine input torque for each operating range state;
selecting a preferred cost and corresponding desired operating points based upon the costs for each of the operating range states; and
selecting the preferred operating range state based upon the preferred costs for the operating range states.

18. Method for controlling a powertrain system including an engine coupled to an input member of an electro-mechanical transmission device including electric machines and an energy storage device connected thereto, the electro-mechanical transmission device operative to transfer power between an input member and an output member of the transmission device and the electric machines and selectively operative in one of a plurality of operating range states, the method comprising:
monitoring an operator torque request and a rotational speed of the output member;
determining an inertial effect of the output member based upon the rotational speed of the output member;
determining an inertial effect of the input member;
determining motor torque outputs from the electrical machines and an engine based upon the inertial effects; and
selecting a preferred input speed from the engine to the transmission based upon the operator torque request and the inertial effects, said preferred input speed from the engine selected to compensate for additional power required to one of increase and decrease the input speed of the input member resulting from the inertial effects of the output member and the input member.

19. The method of claim 18, further comprising determining the inertial effect of the input member for fixed gear operating range states based upon the inertial effect of the output member, parametric values based upon hardware gear and shaft interconnections and the fixed gear mode operating range state.

20. The method of claim 18, wherein the inertial effect of the output member comprises a change in the output member speed over a predetermined elapsed time period.

21. The method of claim 18, wherein the inertial effect of the output member comprises a rotational acceleration of the output member and wherein the inertial effect of the input member comprises a rotational acceleration of the input member.

* * * * *